United States Patent Office 3,500,161
Patented Mar. 10, 1970

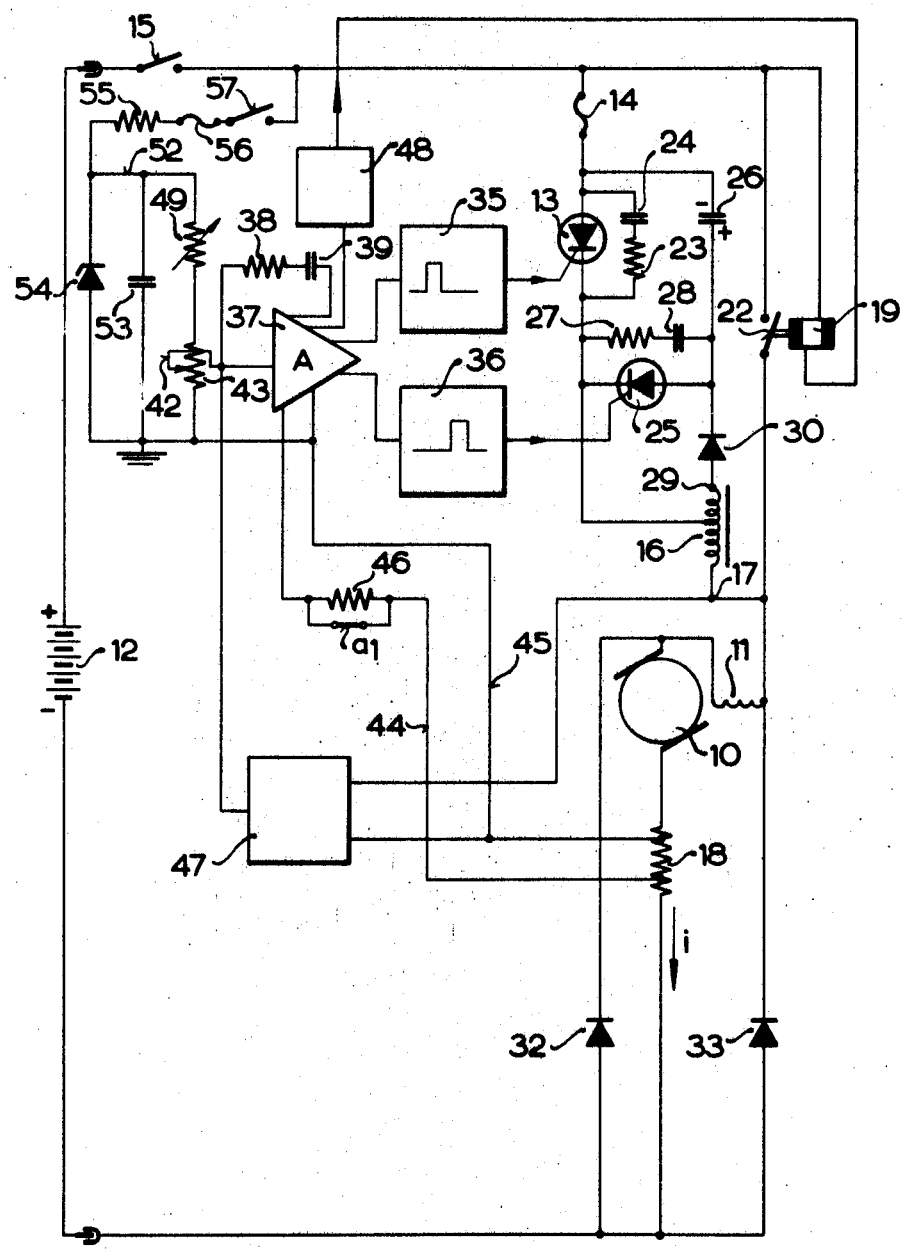

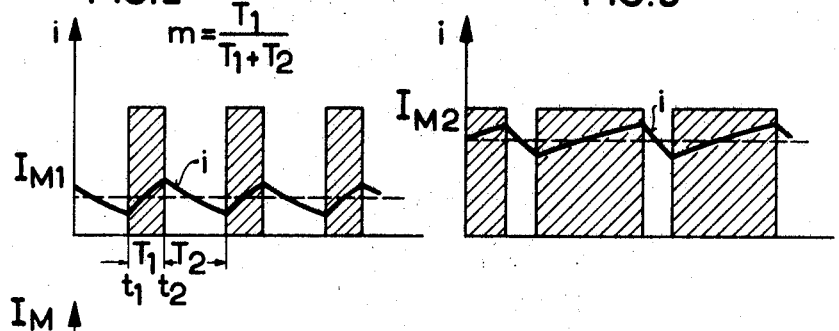

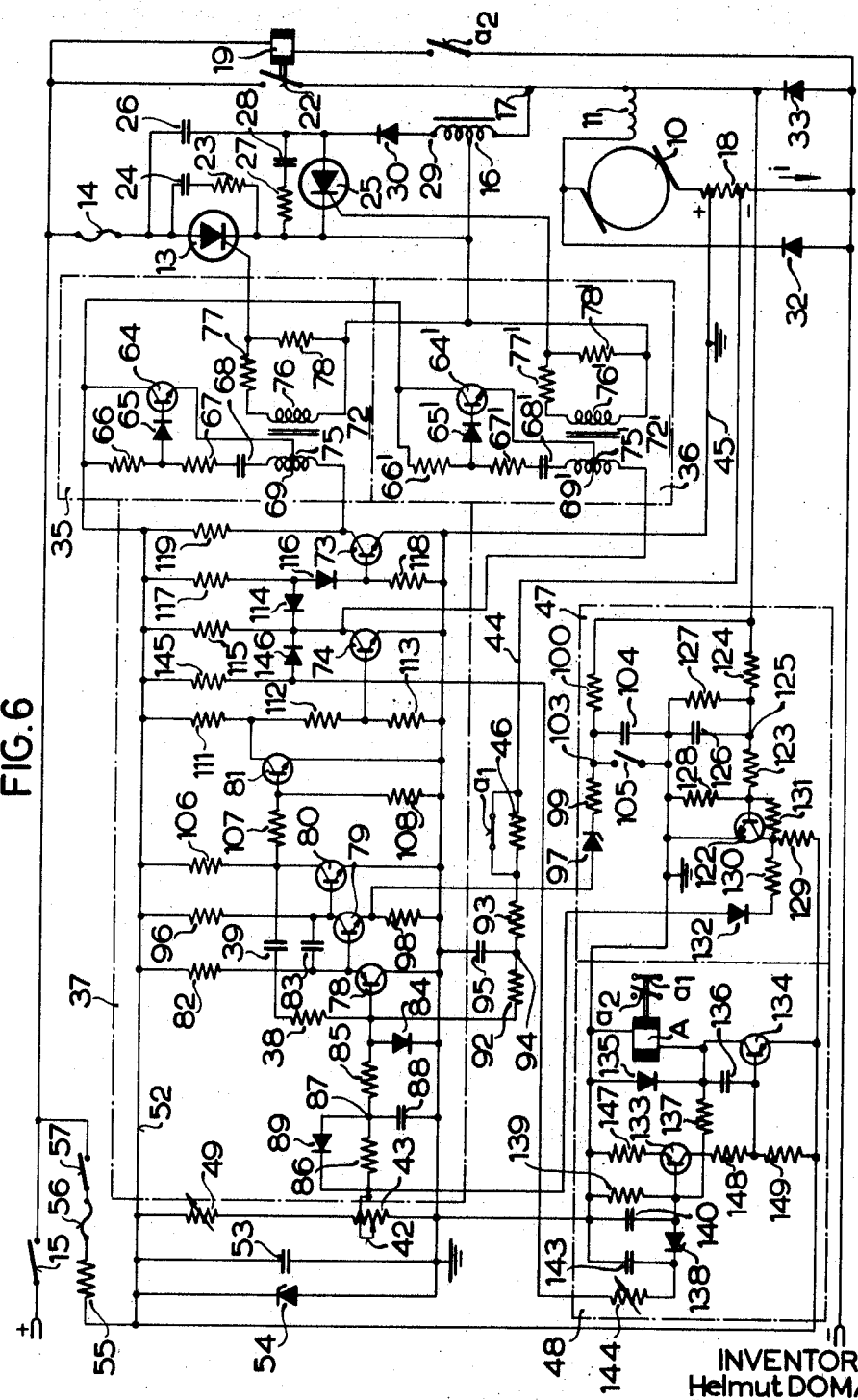

3,500,161
CONTROL ARRANGEMENT FOR ELECTRIC MOTORS HAVING A POWER CIRCUIT INCLUDING A THYRISTOR
Helmut Domann and Peter Gunsser, Stuttgart, Germany, assignors to Robert Bosch G.m.b.H., Stuttgart, Germany, a limited-liability company of Germany
Filed Dec. 12, 1967, Ser. No. 689,988
Claims priority, application Germany, Dec. 21, 1966, B 90,402
Int. Cl. H02p 5/06
U.S. Cl. 318—308                                       19 Claims

ABSTRACT OF THE DISCLOSURE

Average current through the motor is sensed, and a corresponding signal is compared with a power command signal; motor speed is sensed, and an "on-off" control has its on-off time for the thyristor modified in accordance with sensed motor speed; the modification may for example result in the current through the thyristor to be effective current, rather than average current to enable maximum loading of the thyristor or, limit motor speed upon sensed extreme conditions.

---

The present invention relates to a control system for electric motors, and particularly for direct current motors to drive electric vehicles, such as small tractors, fork lift trucks, and the like.

Control systems for electric motors utilizing thyratron-like devices, hereinafter called "thyristors" and provided with a circuit to cause the thyristor to switch OFF from time to time, so that the ON-OFF time of the thyristor causes a desired motor current, are known. The power output of the motor will then be governed by the ratio of the ON-time of the thyristor with respect to the sum of the ON-time and OFF-time of the thyristor.

It has previously been proposed to provide a D-C motor with current pulses, the length and repetition frequency of which depends on a desired speed of the motor—see "Radiotechnik," vol. 4 (1952), pp. 183–185. The referred to article related to the control of motors for model boats. If such an arrangement is utilized with motors having considerable power output, as, for example, in battery driven vehicles, the requirements on the power circuit as well as on the control circuits change. One of the most important requirements is that the drive, and its control, must have a high degree of efficiency, particularly upon starting. Additionally, the drive must be so arranged that it is possible to start with high power while yet preventing control of current by an operator which exceeds the current carrying capabilities of the thyristor, such as for example, a silicon controlled rectifier, singly or in a plural circuit.

Control of the current through the motor should further be continuously and smoothly variable, so that the vehicle can accelerate without jarring, in order to provide for better positioning and movability. The overall transport capability of the vehicle, and thus its efficiency, can be greatly improved thereby.

It is accordingly an object of the present invention to provide a motor control arrangement, including thyristors, which can utilize the capabilities of the thyristors to their limit, without overloading the same, and which has improved efficiency with respect to heretofore known devices.

SUBJECT MATTER OF THE PRESENT INVENTION

Briefly, in accordance with the present invention, the control system for the motor circuit includes a switching circuit connected to control the conduction of the thyristor, a source of command signals—for example under operator control—and a sensing circuit to derive a signal representative of average value of motor current. The sensing signal and the command signals are compared and the resulting comparison signal is utilized to control a switching circuit which establishes the relationship of ON-OFF time of the thyristor, thus controlling current through the motor.

To further improve the efficiency of the motor, and provide for loading of the thyristor to its maximum tolerance limits, a compensating network is provided to compensate for differences between average and effective current through the motor and the thyristor. This network is effective to modify the signal which controls the switching time of the switching network, so that the thyristor will be ON for periods resulting in predetermined effective current, rather than average current as sensed by the sensing circuit.

The compensating network includes a speed sensing arrangement and an attenuating network which attenuates the command signal as the speed of the motor increases, thus permitting higher command signals if the motor is turning only slowly. Preferably, the controllable variable resistance is the collector-emitter path of a transistor, the base of which is connected to a speed sensing circuit. Upon starting the vehicle, the thyristor can thus be loaded to the limit of its current carrying capability, without exceeding the maximum permissible effective value of current therethrough, which effective value is, as is well known, determinative for the heat loading capability of the thyristors which may not be exceeded even for short periods of time.

If the thyristor is to be ON for an appreciable period of time, that is if current is to be supplied without interruption to the motor, the thyristor switching circuit is so constructed that it controls a shunting relay, having contacts in parallel to the thyristor, so that when a switching-on ratio of 100% (constant conduction of the thyristor) is obtained, the thyristor is shunted by a mechanical contact. This relieves current loading of the thyristor, decreases its heating and increases its life, while additionally ensuring that the thyristor will positively switch OFF even after the motor has been supplied continuously with current.

The internal resistance of the thyristor and of shunting contacts is different, and the circuit further includes an automatic compensation arrangement to change the signal representative of average motor current to compensate for differences in potential drop across the thyristor with respect to the shunting contacts. When the shunting contacts are closed, parallel relay contacts are provided to place a resistance in circuit with the sensing signal circuit so that the ratio of command signal to actual sensed signal remains the same and thus the input potential to the control circuit for the thyristor does not change with shunting of the thyristor itself. This feature increases the stability of the entire control network.

The structure, organization, and operation of the invention will now be described more specifically with reference to the accompanying drawings, wherein:

FIG. 1 is a block diagram of the circuit in accordance with the present invention;

FIGS. 2, 3, and 4 are diagrams of average current with respect to time through the motor;

FIG. 5 is a diagram illustrating effective current with respect to ratio of ON-OFF time of the thyristor; and FIG. 6 is a detailed circuit diagram of the arrangement in accordance with the present invention.

Referring now to the drawings, where like elements are indicated by like reference numerals, and particularly to FIG. 1: a series D-C motor 10 has a field winding 11. A battery 12 supplies current to the motor 10 over a power thyristor 13, such as a silicon controlled rectifier. Rather than using a thyratron-like device, it is also, of course, possible to use a grid controlled switch in the circuit according to the present invention.

The anode of thyristor 13 is connected to the positive terminal of battery 12 over a main switch 15 and a fuse 14. The center tap of a tapped transformer 16 is connected to the cathode of thyristor 13, the end 17 of the winding of transformer 16 is connected to one end of field 11. The other end of field 11 is connected to the armature of motor 10. The other terminal of the armature is connected over a measuring resistance 18 to the negative terminal of battery 12.

The thyristor 13 is shunted by a pair of contacts 22, operated by a shunting relay or breaker 19. One terminal of contacts 22 is again connected to winding terminal 17 of transformer 16, and the other contact is connected to the main switch 15. When contacts 22 are closed, that is when relay 19 is operated, it is seen that the main power path of thyristor 13 is shunted.

A series circuit formed of a resistance 23 and condenser 24 is in parallel to thyristor 13. In order to extinguish the thyristor 13, that is, in order to interrupt conduction of thyristor 13, a second thyristor 25 is provided, the cathode of which is connected to the cathode of thyristor 13, and the anode of which connects to a condenser 26 having a high value, such as several hundred microfarads. The other terminal of condenser 26 is connected to the anode of thyristor 13. A series circuit comprising a resistance 27 and condenser 28 is in parallel with thyristor 25.

Terminal 29 of transformer 16 connects to the anode of a diode 30, the cathode of which is connected to the anode of thyristor 25.

The anodes of a pair of diodes 32, 33 connect to the negative terminal of battery 12. The cathode of diode 32 is connected to the terminal of the field winding 11 which also connects to the armature of motor 10; the cathode of diode 33 connects to the other terminal of the field winding 11. Diode 33 acts as a floating diode. When thyristor 13 is blocked, current $i$ of motor 10 can continue to flow through diode 33. Referring to FIG. 2, when thyristor 13 is connected at time $t_1$, the current $i$ in motor 10 rises exponentially. If thyristor 13 is switched OFF at time $t_2$, current $i$ can continue to flow through diode 33, decreasing exponentially. A certain ON-OFF ratio of thyristor 13 that is a predetermined ratio $m$ of conductive time $T_1$ and the sum of conductive and non-conductive time $(T_1+T_2)$ will cause an average current $I_M$ to flow through the D-C motor 10. FIG. 2 illustrates a switching ratio (which may also be called ON-OFF ratio, or mark-to-space ratio) of about 36%, illustrating a comparatively low average current $I_{M1}$. FIG. 3 illustrates that with an ON-OFF ratio of about 80%, a higher average current $I_{M2}$ will flow. Diode 32 is provided in order to prevent current peaks if the motor is reversed. The reversing circuit for the motor is not shown and well known; to reverse, the direction of current flowing through field winding 11 is reversed.

Thyristor 13 is switched ON by an impulse source 35. To cause thyristor 25 to conduct, an impulse source 36 is provided. Both impulse sources 35, 36 are connected to the output of a switching circuit 37. Switching circuit 37 contains a positive feedback circuit including a resistance 38 and a condenser 39, and could be characterized as a multivibrator having a switching ratio and output frequency which is dependent on the potential at its input. The complete circuit diagram of such a switching circuit is illustrated in FIG. 6, in connection with which its operation will also be described.

The command signal for the switching circuit 37 is obtained from a potential appearing at tap point 42 on a potentiometer 43. A signal representative of motor current is obtained across measuring resistance 18, and applied over a pair of lines 44, 45 to the switching circuit 37. Resistance 18 thus acts as a sensing device for motor current, and as a source of sensing signal. A resistance 46 is connected in line 44 which, in its normal condition, is shunted by a contact $a_1$. Contact $a_1$ opens simultaneously upon closing of thyristor shunting contacts 22.

Tap 42 on resistance 43, serving as a source of command signals, is further connected to the output of a function generator 47, the input of which has the potential applied thereto which exists across motor 10. Function generator 47, the exact circuit diagram of which is shown in FIG. 6 and will be described in connection therewith, acts to modify the output value of the command signal 42, 43 in dependence on the potential across motor 10 in such a manner, that as the potential across motor 10 increases, the command signal is decreased.

A transistor switching circuit 48 is additionally connected to the output of switching circuit 37. Transistor switch 48 controls operation of the shunting relay 19. When the switching circuit 37 has reached a switching ratio of 100%, that is when the thryistor 13 is controlled to be constantly conductive, transistor switch 48 supplies an output which energizes relay 19 in order to close contacts 22 (and simultaneously open contact $a_1$, bridging resistance 46).

One terminal of potentiometer 43 is connected to ground, to which also line 45 is connected, and thus one input of function generator 47. Likewise, one terminal of measuring resistance 18 is connected to ground. The other terminal of potentiometer 43 is connected over a variable resistance 49 with a line 52 which will hereinafter be referred to as positive bus 52. Condenser 53 connects between positive bus 52 and chassis, as well as a Zener diode 54, the anode of which also connects to chassis. A fuse 56 and an ignition switch 57 connect, over a resistance 55 positive bus 52 to the main switch 15. The series circuit of potentiometer 43 and resistance 49 thus always has the regulated potential of Zener diode 54 thereacross.

In operation, tap point 42 of potentiometer 43 is set to a particular command value. A delay circuit, described in connection with FIG. 6 gradually applies the command signal to the switching circuit 37, so that the average motor current $I_M$ increases gradually as illustrated in FIG. 4. If function generator 47 were omitted, a predetermined constant value of current $I_M$ will be obtained after a certain time, as illustrated by curves 58, 59, 60 in FIG. 4. The value of this current is smoothly variable. The current need not be limited after the motor, and thus the vehicle has started, which corresponds to 100% switching ratio and thus closing of relay contacts 22. After starting, the motor operates according to the motor operation characteristics, that is the current decreases with increasing speed.

The function generator 47 has the effect that the average current $I_M$ can be greatly increased during starting, that is when the speed of the motor is low, and thus the potential across the motor is low. For example, the current through the motor will be in accordance with chain-dotted curve 63 upon starting rather than in accordance with curve 58. As the potential across motor 10 and field 11 increases, the command value at tap point 42 can then be automatically decreased. This permits substantially better acceleration during starting without overloading of thyristor 13.

Upon starting, switching circuit 37 constantly supplies pulses at its output, triggering pulse sources 35 or 36, respectively. If a pulse source 35 is energized, a pulse is applied to the control electrode of thyristor 13, switching thyristor 13 into conduction. Motor 10 and field 11 are supplied with current. At the same time, condenser 26, which has previously been charged approximately to the value of the potential of battery 12, changes charge. The upper half of the winding of transformer 16, acting in this case like an inductivity, forms a series tuned resonant circuit together with condenser 26 and thyristors 13. The first cycle in this series resonant circuit charges condenser 26 approximately to twice the previous potential, but with opposite polarity. The electrode of condenser 26 which is connected to cathode of diode 30 thus has a potential applied thereto which is more positive than the value of the potential of the battery 12, approximately by battery potential, than the other electrode. This is indicated in FIG. 1 by the + and − signs. Since diode 30 blocks further oscillations, condenser 26 will retain this charge.

Transformer 16 has the effect that the reverse potential charge in condenser 26 increases as the current $I_M$ increases, since the lower half of transformer 16 induces greater potentials in the upper half of the winding.

If a pulse from pulse source 36 is applied to the control electrode of thyristor 25, this thyristor 25 will become conductive. Condenser 26 thus can discharge over thyristors 13 and 25. The current through thyristor 13 is now opposite the normal direction and thyristor 13 will block. The remaining charge of condenser 26 is then applied over transformer 16 to field 11 and motor 10. At the same time, condenser 26 is again charged to the value of battery potential over thyristor 25. As soon as the condenser is charged, thyristor 25 becomes non-conductive since no more current will flow therethrough.

FIG. 5 illustrates the relationship between effective value of the current flowing through thyristor 13 and the time-averaging value of the current $I_M$ in motor 10, and the switching ratio $m$. As is well known, it is the effective value through the thyristor which determines the heating thereof. When thyristor 13 is constantly connected, or when shunting contact 22 is closed ($m=100\%$) then $I_M=I_{eff}$, as can be seen for example at curve $I_M=100$ A. If the switching ratio becomes less, however, the average current $I_M$ may become substantially higher than the effective current $I_{eff}$. This is the basis for the increase of the command signal upon starting, in accordance with the present invention. Function generator 47 is effective as a current limiter for the effective current $I_{eff}$.

Referring now to FIG 6: the parts indicated in blocks in FIG. 1 are indicated within the chain-dotted lines. In addition, the function generator 47 is additionally provided with an electrical speed limiting circuit to limit the speed of motor 10.

The pulse sources 35, 36 to control thyristors 13 and 25 are identical, and only the pulse source 35 will be described in detail; corresponding parts of pulse source 36 have the same reference numerals with the addition of $a'$; thus, for example, 64 and 64' are identical and the circuit in connection with 64' will not be described again.

Pulse sources 35, 36 are blocking oscillators. Blocking oscillators have a very small operating potential and, if a battery potential of only 24 volts is available, blocking oscillators are more reliable than impulse sources utilizing unijunction transistors, which, at low voltages are not capable of providing the necessary trigger power.

Impulse source 35 has an npn transistor 64, the collector of which connects to positive bus 52; its base connects to a cathode of a diode 65. The anode of diode 65 is connected over a resistance 66 with positive bus 52, and over a series connection of a resistance 67 and a condenser 68, and a winding 69 of a transformer 72 to the collector of a control transistor 73. Similarly, the base of transistor 64' is connected to the collector of a control transistor 74. Control transistors 73, 74 are npn transistors, and are parts of the switching circuit 37, which acts as a switching amplifier. As will be described below, only one of the two transistors 73, 74, exclusively, can be in conductive state, these transistors being blocked with respect to each other.

Winding 69 of transformer 72 is provided with a tap 75, connected to the emitter of transistor 64. The output winding 76 of transformer 72 is connected to the cathode of thyristor 13. The other terminal of winding 76 connects over a resistance 77 with the control electrode of thyristor 13. A resistance 78 is connected between the control electrode of thyristor 13 and its cathode. Similarly, the output winding 76' is connected to the cathode and to the control electrode, respectively, of thyristor 25.

Operation of pulse source 35: When control transistor 73 is blocked, pulse source 35 is not supplied with current and is quiescent. As soon as control transistor 73 becomes conductive, its collector has approximately chassis potential, and pulse source 35 is supplied with current, so that it will begin to oscillate. Output winding 76 will have a pulse of about 5 v. potential applied thereacross, and at a frequency of about 6 kHz., which potential triggers thryistor 13 into conductive state. Pulse source 36 operates in the same manner when transistor 74 becomes conductive.

Switching amplifier circuit 37: Besides control transistors 73, 74, pnp transistor 78 and three npn transistors 79, 80, 81 are provided. The three transistors 78, 79, 80 form the actual switching amplifier. Transistor 81 is a phase inversion amplifier, and transistors 73, 74 are low-resistance output power stages, connected in a mutually blocking circuit. The emitter of transistor 78, which is a highly sensitive silicon transistor, connects over a resistance 82 (e.g. approximately 100 kΩ) to positive bus 52. Its emitter connects directly with the base of transistor 79 and over a condenser 83 (e.g. 15 nf.) with the collector of transistor 79.

The collector of transistor 78 is connected directly to chassis. Its base is connected over a series circuit formed of a resistance 38 (e.g. 3 kΩ) and a condenser 39 (e.g. 70 nf.) with the collector of transistor 80. Further, the base of transistor 78 is connected to the anode of a diode 84 and over a pair of resistances 85, 86 (e.g., 3.3 kΩ each) series connected over a junction 87, with the tap 42 of potentiometer 43. A condenser 88 (e.g. 50 μf.) connects between junction 87 and ground. The cathode of diode 84 likewise connects to ground. Diode 84 cooperates with transistor 78, the collector-base path of which likewise acts as a diode. This collector-base diode of transistor 78 provides for a symmetrical input to the switching amplifier 37. Diode 89 is in parallel to resistance 86, the anode of which connects with the junction 87.

The base of transistor 78 is further connected over resistance 46 and a pair of series resistances 92, 93, connected together at a junction 94, with that end of the measuring resistance 18, over line 44, which is connected to the negative terminal of battery 12. The other terminal of measuring resistance 18, that is line 45 is connected to chassis, and represents one terminal of a reference (zero potential) point for the switching amplifier 37 and the further electronic control circuits 47, 48. The resistances 92, 93 are, for example 1 kΩ each, and resistance 46 has for example 0.5 kΩ. A condenser 95 (e.g. 25μf.) connects between junction 94 and chassis and, together with resistances 92, 93, acts as a smoothing filter for the potential across measuring resistance 18.

Resistances 85, 86 and condenser 88 are a delay circuit which delays application of the full command signal as the tap point 42 changes. If the tap point 43 is moved to an increasing potential, condenser 88 must first charge over resistance 86, before the potential at the base of transistor 78 will change. Upon decrease, however, condenser 88 can discharge rapidly over diode 89 without time delay, so that the delay effect will act only upon acceleration, but not upon deceleration or braking. This type of delay network has proved very useful in actual practice.

The base of transistor 80 is connected directly to the collector of transistor 79 and further over a resistance 96 to positive bus 52. The emitter of transistor 79 connects to the anode of a Zener diode 97, and over a resistance 98 to chassis. The cathode of Zener diode 97 is connected over two resistances 99, 100, each interconnected over a junction 103, with one terminal 17 of transformer 16. Condenser 104 (e.g. 50 μf.) connects between junction 103 and chassis. A position switch 105, such as an end or terminal limit switch is in parallel with condenser 104. This limit switch is so arranged that it is closed upon normal operating condition of the environment in which the control network operates. For example, when used with a fork lift truck, the limit switch 105 is coupled to the lifting arm and is closed when the lifting arm is in its normal position. Condenser 104 has the potential across field 11 and motor 10 applied thereto over a resistance 100. If the limit switch 105 is opened, this potential is applied to the switching amplifier 37. If it is closed, application of this potential to the amplifier 37 is blocked.

The emitter of transistor 80 is connected to chassis. Its collector is connected over a resistance 106 to the positive bus 52, and over a resistance 107 to the base of transistor 81 which, is connected over a resistance 108 to chassis. The emitter of transistor 81 is connected directly to chassis. The collector of transistor 81 is connected over resistance 111 with positive bus 52 and over a pair of series connected resistances 112, 113 to chassis. The junction between series connected resistances 112, 113 is connected to the base of control transistor 74, the emitter of which connects to chassis. The collector of control transistor 74 is, as has previously been described, connected to the winding 69'. Additionally, it connects to the cathode of a diode 114 and over a resistance 115 to positive bus 52. The anode of diode 114 is connected to the anode of a diode 116, and over a resistance 117 with positive bus 52. The cathode of diode 116 is connected to the base of the control transistor 73, and over a resistance 118 with chassis. The emitter of transistor 73 connects directly to chassis. The collector of transistor 73 is connected, as previously described, to the winding 69 and over a resistance 119 with positive bus 52.

Operation of the circuit according to FIG. 6 as described up to now: Upon connection of main switch 15 and ignition switch 57, a positive potential of, for example 8 v. will be applied to positive bus 52 (with respect to chassis). This potential is stabilized by Zener diode 54.

Under normal, stop condition, the tap point 42 is so positioned that it is at the ground, or chassis side of potentiometer 43. Condenser 88 is discharged over diode 89. Since no more current will flow through motor 10, 11, both terminals of measuring resistance 18 are at chassis potential, the base of transistor 78 will have chassis potential and a collector current will flow through the transistor 78, blocking transistor 79, causing transistor 80 to become conductive so that its collector will have a potential which is only slightly less positive than chassis potential. This blocks transistor 81 and the voltage divider formed of resistances 111, 112, 113 applies to the base of transistor 74 a positive potential, which will cause transistor 74 to become fully conductive, connecting pulse source (blocking oscillator) 36. Blocking oscillator 36 will apply triggering pulses to thyristor 25.

The collector current of transistor 74 flows partly over the pulse source 36, partly over the parallel connected resistances 115 and 117 (of 1500Ω and 300Ω, respectively for example). The anode of diode 114 thus has a potential which is only slightly less positive than ground potential, so that control transistor 73, and with it pulse source 85 is blocked. Direct current motor 10, 11 thus does not receive current over thyristor 13.

If the position of tap point 42 is changed, so that a potential will arise between it and chassis, current will flow over resistances 86, 85, 92, 93 and 46 to the measuring resistance 18. As previously described, the rise of this current is delayed by condenser 88. This current causes the potential of the base of transistor 78 to rise slightly, so that this transistor becomes less conductive; transistor 79 begins to become conductive; transistor 80 thus becomes somewhat less conductive, causing its collector potential to become more positive. Rise of the collector potential is applied over the R-C series circuit 38, 39 to the base of transistor 78, causing the base to become even more positive, so that this transistor will completely block, causing transistor 79 to become fully conductive, blocking transistor 80. Transistor 81 thus will become fully conductive, shunting resistances 112, 113, so that the base of transistor 74 is effectively placed at ground or chassis potential, blocking transistor 74. The collector potential at transistor 74 thus becomes strongly positive, no more current will flow over diode 114 and the base of transistor 73 will have positive potential applied thereto. Transistor 73 will become conductive, thus causing blocking oscillator 35 to start oscillating. As soon as blocking oscillator 35 begins to oscillate, transistor 13 is switched ON and motor 10, 11, has current applied thereto. The motor will begin to turn, the potential across the motor rising as the speed of the motor rises as is well known.

The current $i$ in motor 10, 11, causes a potential drop across measuring resistance 18, which has the polarity indicated by the + and − signs. This potential drop causes an increase in the potential between the tap 42 and the measuring resistance 18, causing the base of transistor 78 to become more negative. At the same time, the feedback condenser 39 discharges, causing the base of transistor 78 to become more negative. Both signals act together, so that the transistor 78 again becomes conductive after a predetermined period of time. The point and time at which transistor 78 will become conductive will be that point when the current through measuring resistance 18 has exceeded the command value set at the tap point 42 by a predetermined value, as determined by the value of resistances 92, 93 and condenser 95.

As soon as transistor 78 again becomes conductive, transistor 79 becomes less conductive, transistor 80 conducts more and its collector becomes more negative. This change in potential is transmitted over the R-C series network 38, 39 to the base of transistor 78, rendering this transistor more negative so that transistor 78, and with it transistor 80 becomes fully conductive. As above described, control transistor 74 then becomes conductive, control transistor 73 will block and the control electrode of thyristor 13 will no longer receive control impulses, whereas thyristor 25 will have impulses applied thereto from blocking oscillator 36, and will, as above described, block thyristor 13.

Due to the self-induction of the motor, current will continue to flow through diode 33. This current, which decreases exponentially, causes a potential drop across the measuring resistance 18. As soon as this potential drop is sufficiently small, transistor 78 will again block and the cycle above described will start again.

The current $i$ through motor 10, 11, will have a current-time curve which will depend on the command value set by the position of the tap point 42, as indicated in FIGS. 2 and 3. The cross-hatched rectangles symbolize the time during which transistor 13 is conductive. The switching ratio $m$ will depend on the difference of the commanded value and actual value of the current, the load on the motor 10 and will automatically regulate itself to the correct value.

As the speed of motor 10, 11 increases, the potential thereacross increases. When the limit switch 105 is open, that is, for example, when the loading arm of a fork lift truck is at its upper terminal end, condenser 104 will charge over resistance 100. When the potential across condenser 104 exceeds the breakdown potential of Zener diode 97, Zener diode 97 becomes conductive, current will flow through resistance 98 in the emitter circuit of transistor 79, thus blocking transistor 79, and with it, as above described, thyristor 13. This provides a very simple speed limiting or governing action which, as above described, will become effective only upon a certain condition obtaining—for example when the loading arm of a load fork lift truck is completely raised. It is obvious that other parameters and conditions may be used to cause limitation on the speed of the motor, or to prevent runaway thereof, for example if the vehicle would be upset so that the wheels would turn through freely and without resistance.

A certain constant current will eventually flow through motor 10, 11, depending upon the position of the tap point 42, as illustrated in FIG. 4 by curves 58, 59, 60. It is, however, entirely possible to obtain a much higher current through motor 10 without overloading the thyristor 13 upon starting. This is possible because the circuit, insofar as above described, controls the time-averaged value of current through the motor 10, but not to the effective value of this current through thyristor 13. The relationship between the time-averaged value and the effective value is given by the mathematical formulae shown on FIG. 5. FIG. 5 illustrates that, for example, with a switching ratio of $m=50\%$, a time-averaged value of $I_M$ of 130 A. corresponds to an effective value of current through the thyristor 13 of only 95 A. This transistor is thus not fully loaded; in other words, greater acceleration could be obtained if it would be possible to load thyristor 13 to its full current carrying capacity.

The function generator 47, to be described in detail, provides for compensation for the differences between effective and average value. Function generator 47 includes an npn transistor 122, the emitter of which is connected to chassis. Its base is connected over a pair of series-connected resistances 123, 124, having a common junction 125, with the terminal end 17 of transformer 16. The parallel circuit of a condenser 126 and a resistance 127 is connected between junction 125 and chassis. A resistance 128 connects between the base of transistor 122 and chassis. The collector of transistor 122 is connected over a resistance 129 with positive bus 52 and over a resistance 130 and a diode 132 with the tap 42; and over a resistance 131 with the base of transistor 122. Resistance 131 is a feedback resistance, providing for proper operation of the function generator 47 and proper transfer relationship thereof. Diode 132 is connected to the tap 42 with its anode.

Operation of function generator 47: The potential between base and emitter of transistor 122 is zero, and this transistor is blocked, if no current flows through motor 10, 11. Thus, no current can flow from tap 42 over resistance 130 and transistor 122 to chassis, that is the full command signal set on the tap 42 will be applied to the switching amplifier 37. Diode 132 at the same time prevents that current from the positive bus 52 can flow to tap point 42 and influences the command value.

As the speed of motor 10, 11 increases, the potential thereacross increases; similarly, the transistor 122 becomes conductive so that as the speed increases, a greater portion of the current from tap 42 can flow over transistor 122. In other words, transistor 122, connected to chassis, becomes increasingly conductive with increasing speed of the motor and, being placed with resistance 130 in parallel to the resistance 43 causes a drop at the potential of tap point 42. Thus, as the speed of the motor increases, the command value is automatically reduced. This, in effect, acts as a current limiter and enables starting with substantially higher current as illustrated in FIG. 4 by the curve 63, which, when function generator 47 is used, is obtained instead of curve 58.

Condenser 126 acts as a smoothing filter condenser since, at the terminal 17 of transformer 16, an undulating potential will appear which must first be filtered.

Certain operating conditions will cause the transistor 13 to be constantly turned on. It is of advantage that, under such conditions, thyristor 13 is shunted because otherwise, condenser 26 would discharge after a certain period of time and it would no longer be possible to turn transistor 13 OFF. Additionally, thyristor 13 will not heat as much.

Transistor switch 48 is provided to control the shunting relay 19. It contains an npn transistor 133, and a pnp transistor 134. Transistor 134 controls a relay A having two contacts $a_1$ and $a_2$ (contacts $a_1$ and $a_2$ are illustrating the mechanical connection and once illustrating the electrical circuit function). Contact $a_1$ is in parallel to resistance 46 and contact $a_2$ controls relay 19. Both contacts are illustrated in the condition in which they are if relay A carries no current.

Transistors 133, 134 are connected similarly to a Schmitt trigger. The emitter of transistor 134 is connected to positive bus 52; its collector connects through winding of relay A and to ground. A peak-suppression diode is in parallel to the winding of relay A. Condenser 136 is connected between collector and base of transistor 134; further, the collector is connected over a feedback resistance 137 with the base of transistor 133 which, in turn, connects to the anode of a Zener diode 138 and over the parallel network of a resistance 139 and a condenser 140 with ground. The cathode of Zener diode 138 connects over a condenser 143 with chassis and over a pair of series-connected resistances 144, 145 with the positive bus 52. The junction point of resistances 144, 145 connects to the anode of a diode 146, the cathode of which connects to the collector of transistor 74.

The emitter of transistor 133 connects the chassis, and over two series-connected resistances 148, 149 to positive bus 52. The junction of resistances 148, 149 is connected to the base of transistor 134.

Operation of transistor switch 48: When switching amplifier 37 supplies switching pulses, the collector of transistor 74 becomes alternatingly positive and negative. Condenser 143 is thus charged alternatingly over resistance 145 (e.g. 2 $k\Omega$) and discharged over diode 146 and transistor 74, so that only a low potential will build up thereacross. If thyristor 13 becomes continuously conductive, transistor 74 will become continuously blocked so that no more current will flow over diode 146. Condenser 143 will charge more and when the predetermined Zener voltage of Zener diode 138 is reached, so that Zener diode 138 becomes highly conductive, base current will flow through transistor 133 which was previously blocked. Instead of a Zener diode, any other diode having a predetermined breakdown potential can be used. The collector current of transistor 133 will cause the junction point of resistances 148, 149 to become more negative, thus transistor 134 will become fully conductive and relay A will operate, closing contact $a_2$. Shunting relay 19 will be energized, closing shunting contacts 22, and shunting the power path of thyristor 13. The feedback resistance 137 causes abrupt switching and a certain holding action, similar to hysteresis.

As soon as shunting contacts 22 close, the current through motor 10, 11 will increase over the value previously applied to the command signal source 42, 43, since the internal resistance of the thyristor 13 is no longer in the power path of the motor. Thus, the switching ratio of the switching amplifier 37 which previously would have been $m=100\%$, would be reduced, and the switching amplifier 37 would turn thyristor 13 off. This would cause transistor switch 48 to turn off, opening the shunting contact 22. In order to prevent this undesired action, contact $a_1$ is provided which opens as soon as relay A operates, thus inserting resistance 46 additionally into the line 44. This changes the relationship of command value to sensed value so that the potential at the input to the switching amplifier 37 remains unchanged. The shunting contacts 22 will remain closed and the switching ratio $m$ will remain at 100%.

If the command signal, set at tap 42 is changed to cause a smaller current to flow over resistances 86, 85, than over resistances 92, 93, 46 to the measuring resistance 18

(command signal<sensed signal) switching amplifier 37 again commences to control the transistor 74 to switch on and off so that the transistor switch 48 will only then open shunting circuit 22.

The power necessary to operate the circuit according to the present invention is very small; it is reliable in operation, provides for high starting power to a motor, is safe by limiting motor speed upon unusual operating conditions, for example raised lifting fork, and provides smooth change of speed.

The present invention has been described in connection with control of a direct current motor, to be operated from a battery, and principally in connection with a fork lift truck. Other arrangements may be used and changes in the circuits and their values may be made to meet specific design requirements, within the scope of the inventive concept.

What is claimed is:

1. Control system for motors including a power thyristor 13 in the motor circuit, the relative ON-time to the sum of ON and OFF time during one ON-OFF sequence of the thyristor determining the power applied to said motor, comprising
   a source (42) supplying a command signal;
   means (18) sensing average current through said motor and supplying an average current signal;
   a control circuit (37, 35, 36) providing ON-OFF pulses for said thyristor, said control circuit being connected to and responsive to both said command signal and to said sensed current signal to provide pulses having an ON-OFF relationship determined by the difference in command signal and average current signal;
   means (33, 97) sensing motor speed;
   and means (105; 47) connected to said control circuit modifying the response of said control circuit as a function of motor speed.

2. System according to claim 1, wherein said means modifying the response of said control circuit includes an attenuating network (122) having a variable resistance connected in circuit with said means (42) supplying a command signal;
   and said motor speed sensing means controls the attenuation of said network.

3. System according to claim 2, wherein the means supplying a command signal comprises a tapped resistance (42) connected across a source of current;
   and wherein said means sensing motor speed comprises means sensing the counter EMF of said motor;
   said variable resistance (122) comprising the collector-emitter path of a transistor, said collector-emitter path being connected in parallel across the tap point of said resistance (42) and a terminal thereof so that, upon decrease of collector-emitter resistance of said transistor, decrease of said command signal will result.

4. System as claimed in claim 2, wherein said compensating network (47) compensates for differences between time-average and effective current through both said motor (10) and said power thyristor (13), said compensating network having a compensation function depending upon motor speed and effective to modify the command signal and controlling the switching time of said switching network so that the power thyristor (13) will be ON for periods resulting in predetermined effective current, rather than time-average current.

5. System as claimed in claim 1, including a shunt relay having contacts (22) in parallel with said power thyristor (13);
   a control switching circuit (48) connected to the coil (19) of said shunt relay; and
   switching sensing means connected to said switching circuit (37) and sensing continuous ON-time of said power thyristor ($m=100\%$), said switching sensing means controlling said control switching circuit to energize said relay to shunt said power thyristor upon detection of continuous ON-time of said power thyristor.

6. System as claimed in claim 5 including compensating means (46) in circuit with said sensing means (18) deriving a signal representative of average value of motor current to compensate for change of said signal due to difference in resistance of said thyristor and said contacts when said contacts are closed and shunt said thyristor.

7. System as claimed in claim 6, including switching means switching synchronously with said relay to render said compensating means effective upon closing of said shunt relay contacts.

8. System as claimed in claim 6, wherein said compensating means is a resistance connected in circuit with said sensing means to attenuate the signal applied to said comparator means.

9. System as claimed in claim 1, including a low-pass filter circuit (92, 93, 95) in circuit with said sensing means.

10. System as claimed in claim 1, wherein said means (33, 97) sensing the voltage across said motor are connected to control said switching circuit (37) to switch said power thyristor (13) OFF, if said voltage exceeds a predetermined value.

11. System as claimed in claim 1, including a control network (79, 97, 98, 99) connected in said switching circuit (37) and controlling said switching circuit (37) to switch said power thyristor (13) OFF;
    and wherein said means modifying the response of the control circuit includes switchable means (105) rendering said control network effective upon operation of said switchable means.

12. System as claimed in claim 11, wherein said means sensing motor speed includes means (100, 104) sensing voltage across said motor;
    and wherein said control network includes voltage-sensitive means (97) interconnecting said voltage sensing means and said switching circuit and rendered effective upon
    (a) operation of said switchable means (105) and
    (b) upon said motor voltage exceeding a predetermined value, as sensed by said voltage-sensitive means, so that said power thyristor (13) is switched OFF if the voltage across the motor, and hence motor speed exceeds a predetermined value and said switchable means (105) is operated.

13. System as claimed in claim 11, wherein said switchable means is a limit switch.

14. System as claimed in claim 1, including a rate delay network connected to said command signal source to prevent sudden changes in command signal, said rate delay network including a T-resistor-condenser network interconnecting said command signal source and said switching circuit.

15. System as claimed in claim 14, including a diode (89) in parallel to at least a resistance of said T-network connected to said source of command signals, said diode being poled to provide for discharge of the condenser of said T-network through said diode upon decrease of command potential.

16. System as claimed in claim 1, wherein said means modifying the response of said control circuit includes a compensating network (47) comprising a controllable variable resistance means (122) connected in parallel with said source of command signals (42) and variably attenuating said command signals as the speed of said motor increases.

17. System as claimed in claim 16, wherein said source of command signals comprises a source (42) of current (12);
    a tapped, settable resistance (42) across said source;
    and said controllable variable resistance means (122) is connected effectively in parallel with a tap and a terminal of said settable resistance means.

18. System as claimed in claim 16 wherein said controllable variable resistance means is the collector-emitter path of a transistor (122), the base of said transistor being connected to have a signal applied thereto representative of speed of the motor and poled so that, as motor speed increases, said transistor becomes increasingly conductive, said collector-emitter resistance being in parallel with said source of command signals to attenuate said source.

19. System as claimed in claim 16, including a diode (132) in the interconnection from said controllable variable resistance means (122) to said source of command signals (42) to prevent undesired reverse current flow from said source to said variable resistance means.

References Cited

UNITED STATES PATENTS

| | | | |
|---|---|---|---|
| 3,176,209 | 3/1965 | Capello | 318—308 |
| 3,280,396 | 10/1966 | Beck et al. | 318—138 |
| 3,337,786 | 8/1967 | Heyman et al. | 318—345 |

ORIS L. RADER, Primary Examiner

K. L. CROSSON, Assistant Examiner

U.S. Cl. X.R.

318—310, 332, 341